(12) United States Patent
Egawa et al.

(10) Patent No.: US 7,637,561 B2
(45) Date of Patent: Dec. 29, 2009

(54) FLOOR PANEL IN VEHICLE, HAVING BEAD WHOSE INCLINED SURFACE HAS GRADUALLY-CHANGED INCLINATION ANGLE

(75) Inventors: Yasuhisa Egawa, Sakura (JP); Shigeto Yasuhara, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/042,036

(22) Filed: Mar. 4, 2008

(65) Prior Publication Data

US 2008/0258503 A1    Oct. 23, 2008

(30) Foreign Application Priority Data

Apr. 20, 2007 (JP) .............................. 2007-111558

(51) Int. Cl.
*B62D 25/20* (2006.01)
(52) U.S. Cl. ................................ 296/193.07
(58) Field of Classification Search ............ 296/193.07, 296/204

See application file for complete search history.

(56) References Cited

U.S. PATENT DOCUMENTS

| 7,011,359 | B2 * | 3/2006 | Watanabe et al. ...... 296/187.08 |
| 7,097,238 | B2 * | 8/2006 | Fujita .................... 296/193.07 |
| 7,195,306 | B2 | 3/2007 | Egawa et al. |
| 2004/0174046 | A1 * | 9/2004 | Kamura et al. ......... 296/193.07 |
| 2008/0258506 | A1 * | 10/2008 | Egawa et al. ................ 296/204 |
| 2008/0277971 | A1 * | 11/2008 | Sato ...................... 296/203.04 |

FOREIGN PATENT DOCUMENTS

| EP | 1 712 454 | | 10/2006 |
| JP | 2-81286 | | 6/1990 |
| JP | 09095265 | A * | 4/1997 |
| JP | 10-258775 | | 9/1998 |
| JP | 2001039346 | A * | 2/2001 |
| JP | 2005096734 | A * | 4/2005 |
| JP | 2006-298076 | | 11/2006 |
| JP | 2008265537 | A * | 11/2008 |
| WO | WO 2008132909 A1 * | | 11/2008 |

* cited by examiner

*Primary Examiner*—H Gutman
(74) *Attorney, Agent, or Firm*—Rankin, Hill & Clark LLP

(57) ABSTRACT

In a floor panel in a vehicle, a plurality of beads, each having an arc form, are coaxially arranged on the floor panel; the center of the coaxially-arranged beads is positioned on either of side sills provided on the right and left sides of the vehicle; and each of the beads has an inclined surface, and the inclination angle of the surface with respect to the horizontal position is gradually decreased in a direction from the inner side to the outer side along the width of the vehicle. Typically, each of the beads protrudes upward, and has an inclined rear wall, and the inclination angle of the rear wall with respect to the horizontal position is gradually decreased in the direction from the inner side to the outer side along the width of the vehicle.

2 Claims, 8 Drawing Sheets

FLOOR PANEL IN VEHICLE, HAVING BEAD WHOSE INCLINED SURFACE HAS GRADUALLY-CHANGED INCLINATION ANGLE

BACKGROUND OF THE INVENTION

1. Field of the Invention

The present invention relates to a floor panel in a vehicle.

Priority is claimed on Japanese Patent Application No. 2007-111558, filed Apr. 20, 2007, the contents of which are incorporated herein by reference.

2. Description of the Related Art

In a known floor panel in a vehicle, which is developed for improving the rigidity thereof, a plurality of beads, each having an arc form, are coaxially arranged over almost the entire surface of the floor panel (see, for example, Japanese Unexamined Patent Application, First Publication No. 2006-298076).

During movement of the vehicle, flying objects such as small stones, which are dislodged by the front wheels of the vehicle, may hit against the lower surface of the floor panel.

In the above bead-arranged floor panel, when such flying objects hit against an inclined surface of the beads, the hitting angle is larger in comparison with a hitting against a horizontally-arranged flat floor panel. Therefore, a larger impact (i.e., reactive force) occurs, and the relevant objects may scrape off the coating on the inclined surface, which may cause rust.

SUMMARY OF THE INVENTION

In light of the above circumstances, an object of the present invention is to provide a floor panel in a vehicle, in which the lower surface is not easily damaged, and the rigidity is relatively high.

Therefore, the present invention provides a floor panel (e.g., a floor panel 3 or 4 in an embodiment explained later) in a vehicle, wherein:

a plurality of beads (e.g., beads 50 in the embodiment), each having an arc form, are coaxially arranged on the floor panel;

the center of the coaxially-arranged beads is positioned on either of side sills (e.g., side sills 5 and 6 in the embodiment) provided on the right and left sides of the vehicle; and each of the beads has an inclined surface (e.g., a rear wall 65 in the embodiment), and the inclination angle of the surface with respect to the horizontal position is gradually decreased in a direction from the inner side to the outer side along the width of the vehicle.

In a typical example, each of the beads protrudes upward, and has an inclined rear wall (e.g., the rear wall 65 in the embodiment), and the inclination angle of the rear wall with respect to the horizontal position is gradually decreased in the direction from the inner side to the outer side along the width of the vehicle.

In another typical example, each of the beads protrudes downward, and has an inclined front wall, and the inclination angle of the front wall with respect to the horizontal position is gradually decreased in the direction from the inner side to the outer side along the width of the vehicle.

As small stones or the like, which are dislodged by front wheels of the vehicle, fly toward the back side of the front wheels, the flying range of the small stones or the like is offset to the outer side in the width direction of the vehicle. In accordance with the above structure, in each bead, the more outer in the width direction of the vehicle, the smaller the inclination angle of the inclined surface in the bead. Therefore, when flying objects hit against the inclined surface of the bead at the outer side in the width direction of the vehicle, the relevant impact (i.e., reactive force) can be reduced. Accordingly, the inclined surface is not easily damaged, for example, the coating applied to the inclined surface is not easily scraped off.

DETAILED DESCRIPTION OF THE INVENTION

Hereinafter, an embodiment of the present invention will be described with reference to the appended FIGS. 1 to 12. The upper-to-lower direction, the front-to-back direction, and the left-to-right direction in the following explanation respectively coincide with the upper-to-lower direction, the front-to-back direction, and the left-to-right direction of the relevant vehicle.

Figure 1:
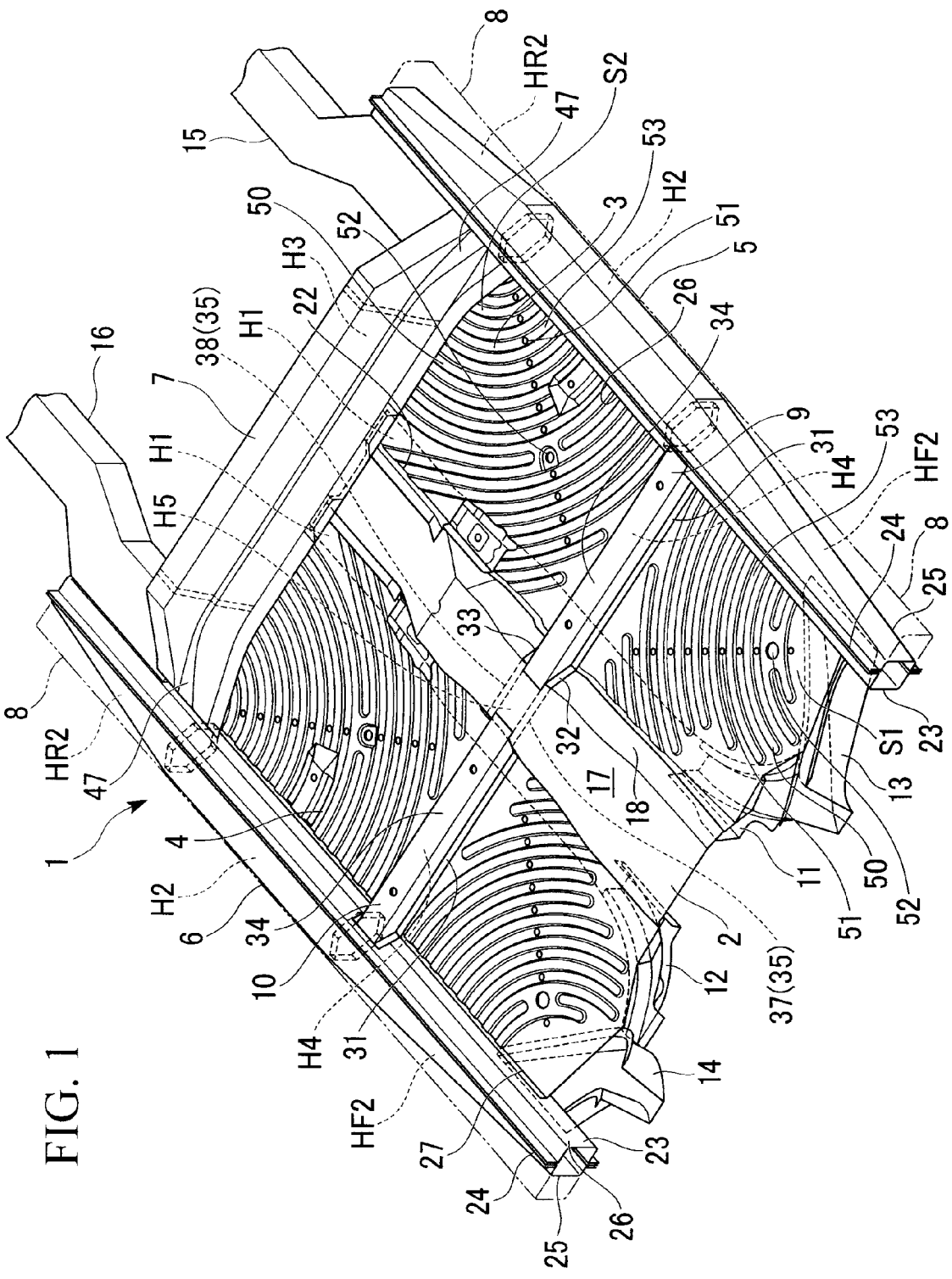
FIG. 1 is a perspective view showing the appearance of a floor of a vehicle body, as an embodiment of the present invention.
Figure 2:
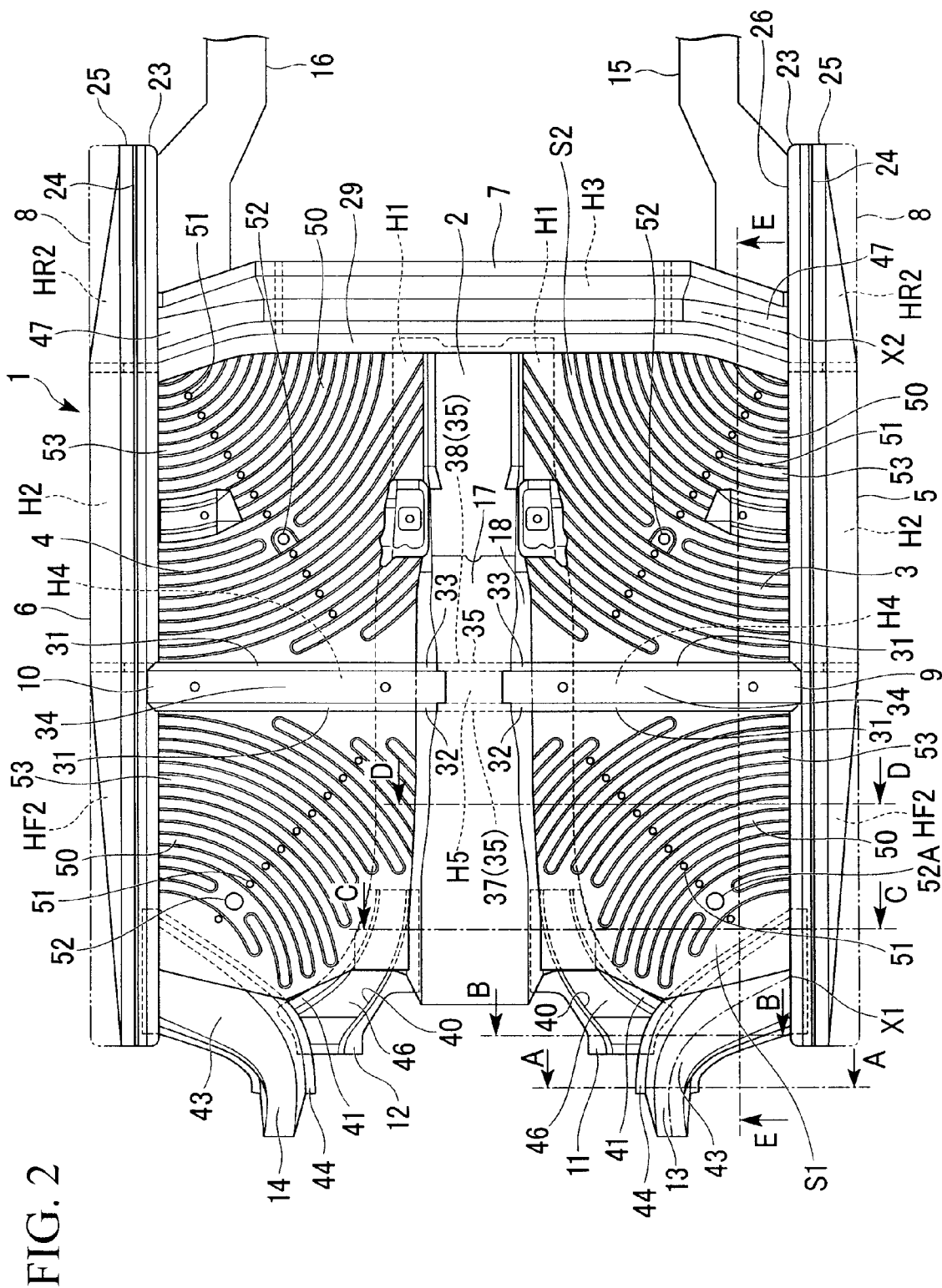
FIG. 2 is a plan view of the floor of the vehicle body in the embodiment.

FIG. 1 is a perspective view showing the appearance of a floor 1 of a vehicle body, as an embodiment of the present invention. FIG. 2 is a plan view of the floor 1 of the vehicle body.

As shown in FIGS. 1 and 2, in the floor 1 of the relevant vehicle, a floor tunnel frame 2 is formed at the center in the width direction of the vehicle, and it extends in the front-to-back direction of the vehicle body. Reference numerals 3 and 4 indicate floor panels on the left and right sides of the floor tunnel frame 2, and the inner side edges of the floor panels 3 and 4 are joined to the corresponding side edges of the floor tunnel frame 2. To the outer side edges of the floor panels 3 and 4, a left side sill 5 and a right side sill 6 are respectively attached. The side sills 5 and 6 are frame members of the vehicle body, which extend in the front-to-back direction of the vehicle body.

The rear parts of the side sills 5 and 6 are coupled to each other via a middle cross member 7, which is also a frame member of the vehicle body. The front edge of the middle cross member 7 is joined to the rear edges of the floor panels 3 and 4. In addition, the substantial center of the floor tunnel frame 2 in the front-to-back direction is coupled with the side sills 5 and 6 by means of front cross members 9 and 10 on the left and right sides of the floor tunnel frame 2.

Reference numerals 11 and 12 indicate extensions on the left and right sides of the floor tunnel frame 2, and an end of each extension is connected to the corresponding side wall of a front end part in the floor tunnel frame 2. Reference numerals 13 and 14 indicate outriggers. An end of the outrigger 13 is connected to the front end part of the left side sill 5, and an end of the outrigger 14 is connected to the front end part of the left side sill 6. The left extension 11 and the right extension 12 are respectively coupled to the inner side walls of the outriggers 13 and 14.

The left and right ends 47 of the middle cross member 7 each bend obliquely forward. Reference numeral 15 and 16 indicate rear side frames on the left and right sides. A front end part of the rear side frame 15 on the left side is joined to the left end 47 of the middle cross member 7 and the inner wall of a rear part of the left side sill 5. Similarly, a front end part of the rear side frame 16 on the right side is joined to the right end 47 of the middle cross member 7 and the inner wall of a rear part of the right side sill 6. The floor 1 is mainly formed by the floor panels 3 and 4, and the floor tunnel frame 2.

In addition, in the present embodiment, the middle cross member 7, the front cross members 9 and 10, the extensions 11 and 12, and the outriggers 13 and 14 form cross frame members for coupling the floor tunnel frame 2 and the side sills 5 and 6 with each other in the width direction of the vehicle.

Figure 3:
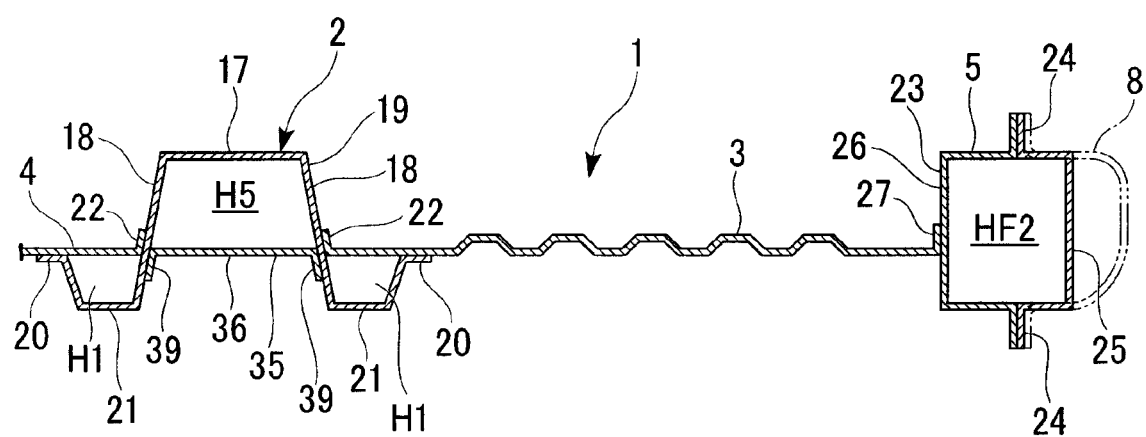
FIG. 3 is a sectional view along line D-D in FIG. 2.

FIG. 3 is a sectional view along line D-D in FIG. 2. As shown in FIG. 3, the floor tunnel frame 2 is formed by a tunnel main body 19 and wing parts 21. The tunnel main body 19 is formed by an upper wall 17 and inclined side walls 18, so as to protrude upward from the position of the floor panels 3 and 4. Each wing part 21 (i) extends downward from the corresponding side edge of the tunnel main body 19, so as to be lower than the position of the floor panels 3 and 4, (ii) extends outward in the horizontal direction, and (iii) further extends upward so as to be welded to the corresponding lower surface of the floor panels 3 and 4 via a flange part 20.

At the inner side edges of the floor panels 3 and 4, flange parts 22 are formed upward, and they are welded to the corresponding side walls 18 of the tunnel main body 19 in the floor tunnel frame 2. Accordingly, closed-section structures H1, which extend in the front-to-back direction of the vehicle body, are formed by the floor panels 3 and 4 and the wing parts 21, wherein the structures H1 are provided below the side walls of the floor tunnel frame 2 and the floor panels 3 and 4.

The side sills 5 and 6 each have (i) a side sill inner part 23 protruding toward the interior of the vehicle, (ii) a reinforcement 25 joined to the side sill inner part 23 by means of upper and lower joint flange parts 24 so as to form a closed-section structure, and (iii) a side sill outer part 8 which is used for further forming a closed-section structure on the outside of the reinforcement 25, and is connected to the joint flange parts 24.

The side sill inner part 23 has the same sectional shape over almost the entire length. In contrast, as shown in FIGS. 1 and 2, the reinforcements 25 have oblique closed-section form parts HF2 and HR2, in which the protruding length toward the outside (along the width of the vehicle) gradually increases from the front or rear end to a center part along the front-to-back direction. Accordingly, maximum protrusion closed-section parts H2 having the maximum outward protruding length from the relevant reinforcement 25 are provided over a specific length in the front-to-back direction of the vehicle body. The maximum protrusion closed-section parts H2 are positioned between the middle cross member 7 and the front cross members 9 and 10. To the inner side walls 26 of both side sill inner parts 23, flange parts 27 are joined, which are formed upward on the outer edges of the floor panels 3 and 4.

Figure 4:
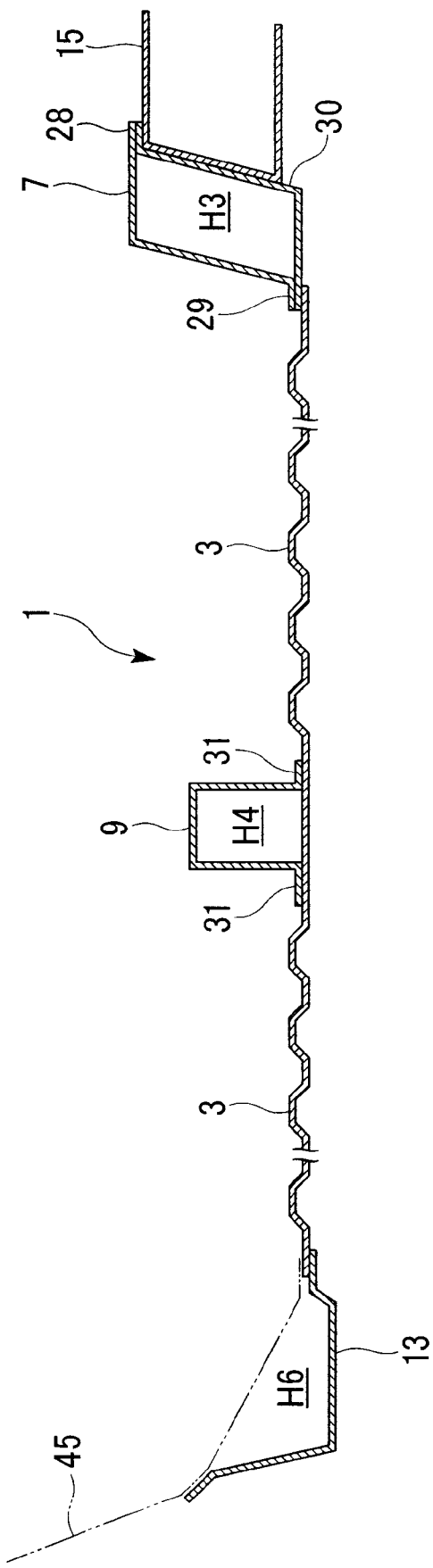
FIG. 4 is a sectional view along line E-E in FIG. 2.

FIG. 4 is a sectional view along line E-E in FIG. 2. As shown in FIG. 4, in the middle cross member 7, two members, each having an L-shaped section, face each other, and a rear upper-edge flange part 28 and a front lower-edge flange part 29 are each subjected to welding, so as to form a closed-section structure H3 having a substantially rectangular form and functioning as a frame part of the vehicle body. The front lower-edge flange part 29 is welded to the rear edge of the floor panels 3 and 4. To a rear wall 30 of the middle cross member 7, the front ends of the rear side frames 15 and 16 are joined.

The front cross members 9 and 10 each have a hat-shaped section which is open downward. In addition, front and rear flange parts 31 of the front cross member 9 are joined to the upper surface of the floor panel 3, and similarly, front and rear flange parts 31 of the front cross members 10 are also joined to the upper surface of the floor panel 4, thereby forming closed-section structures H4 on the upper surfaces of the floor panels 3 and 4. The closed-section structure H4 function as frame parts (along the width of the vehicle) of the vehicle body.

The outer side ends of the front cross members 9 and 10 are each joined to the inner side wall 26 and a part of the upper wall of the corresponding side sill inner part 23. As shown in FIGS. 1 and 2, in each inner end part of the front cross members 9 and 10, a front flange part 32 and a rear flange part 33 are joined to the corresponding side wall 18 of the floor tunnel frame 2. In addition, an end edge of each upper wall 34 of the front cross members 9 and 10 is joined to the upper wall 17 of the floor tunnel frame 2.

As shown in FIG. 3, on the back side of the tunnel main body 19 in the floor tunnel frame 2, a joint frame 35 is fastened at a position for connecting the front cross members 9 and 10 on the left and right sides. The joint frame 35 has a hat-shaped section (along the front-to-back direction of the vehicle body) which is open upward, that is, toward the opposite side in comparison with the front cross members 9 and 10. The height of the lower wall 36 of the joint frame 35 coincides with that of the floor panels 3 and 4. A front flange 37 and a rear flange 38 of the joint frame 35 (see FIGS. 1 and 2) are joined to the back side of the tunnel main body 19, and side edges 39 of the lower wall 36 are joined to the corresponding side walls of the wing parts 21 in the floor tunnel frame 2.

Accordingly, a closed-section structure H5 is formed between the joint frame 35 and the floor tunnel frame 2, and is coupled with the closed-section structures H4, which are formed (i) between the front cross member 9 and the floor panel 3 and (ii) between the front cross member 10 and the floor panel 4, thereby forming a frame body of the vehicle body which is a substantially single body for coupling the side sills to each other.

Figure 5:
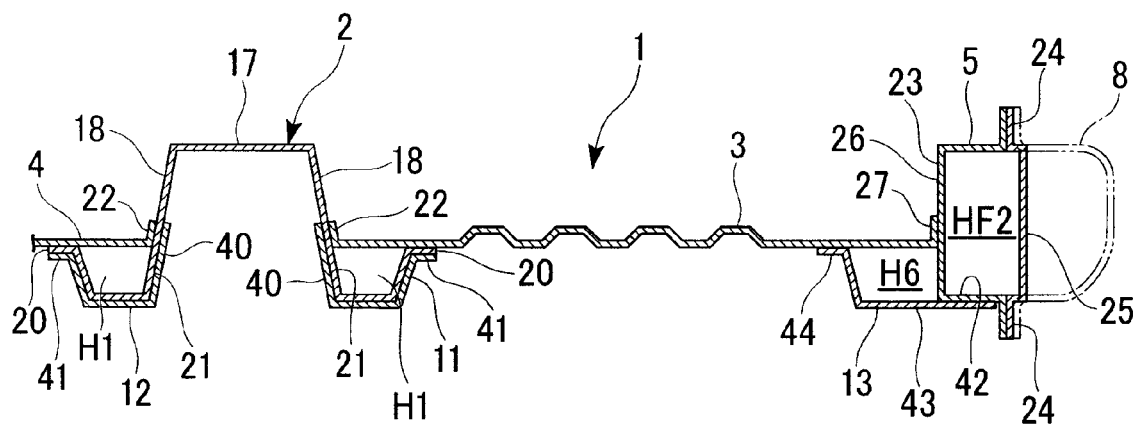
FIG. 5 is a sectional view along line C-C in FIG. 2.

FIG. 5 is a sectional view along line C-C in FIG. 2. As shown in FIG. 5, in each of the extensions 11 and 12 on the left and right sides, one end has a form which is open upward so as to totally cover the corresponding wind part 21 (of the floor tunnel frame 2) from the lower side thereof. In each inner side wall 40 of the extensions 11 and 12, a part corresponding to the relevant flange part 22 of the floor panels 3 and 4 is joined to the back face of the corresponding side wall 18 in the tunnel main body 19 of the floor tunnel frame 2. An outer flange part 41 in the one end of each of the extensions 11 and 12 is superimposed on the flange part 20 of the corresponding wing part 21.

On the other hand, one ends of the outriggers 13 and 14 are respectively joined to the floor panels 3 and 4 by means of (i) a lower wall 43, (ii) a part which rises up from the lower wall 43 toward the lower surface of the corresponding floor panel, and (iii) a flange part 44 in each outrigger, thereby forming closed-section structures H6 together with the pair of the side sill 5 and the floor panel 3, and the pair of the side sill 6 and the floor panel 4.

Figure 6:
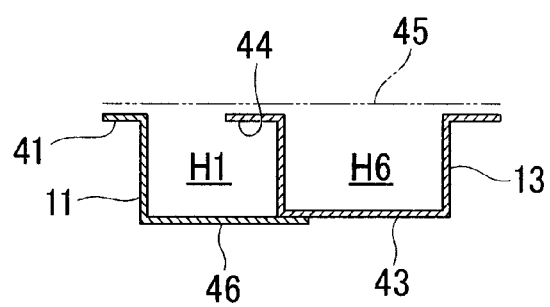
FIG. 6 is a sectional view along line B-B in FIG. 2.
Figure 7:
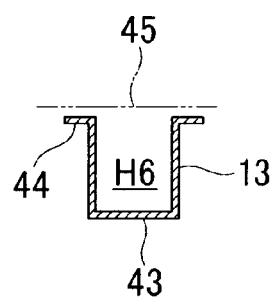
FIG. 7 is a sectional view along line A-A in FIG. 2.

The extensions 11 and 12 and the outriggers 13 and 14 having the above-described structure have a form which gradually rises up toward the front of the vehicle along the back face of a dashboard lower panel 45 (see the alternate long and two short dashes line in FIG. 4) which is attached to the upper surfaces of the front edges of the floor panels 3 and 4. FIG. 6 is a sectional view along line B-B in FIG. 2, and FIG. 7 is a sectional view along line A-A in FIG. 2. As shown in FIGS. 6 and 7, the front side of each of the outriggers 13 and 14 has a hat-shaped section, and to the lower wall 43 thereof, the lower wall 46 of the corresponding extension (11 or 12) is joined, that is, both lower walls are joined to each other. In addition, the rear end of a front side frame (not shown) of the vehicle is connected to the front end of the outrigger 13. In each of FIGS. 6 and 7, the alternate long and two short dashes line indicates the dashboard lower panel 45 which forms the closed-section structures H6 and H1 together with the outriggers 13 and 14, and the extensions 11 and 12.

As shown in FIGS. 1 and 2, a number of beads 50 having a rippled form (as water rings) are regularly provided on the almost entire surfaces of the floor panels 3 and 4, and a number of liquid discharge holes 51 and a plurality of positioning holes 52 are also provided. The floor panels 3 and 4 have a symmetrical form between the left and right sides of the floor tunnel frame 2, and the beads 50, the liquid-discharge holes 51, and the positioning holes 52 also have a symmetrical arrangement on the floor panels 3 and 4 of the left and right sides. Below, the left floor panel 3 will be explained in detail, and explanations of the right floor panel 4 are omitted.

In the sectional views of FIGS. 3 to 5, the shape of the beads 50, which is actually complex, is simplified for convenience of explanations.

In the floor panel 3, there is a difference in the arrangement pattern of the beads 50 between the front side and the rear side of the front cross member 9.

More specifically, in a substantially rectangular area S1 (called the "front area") on the front side of the front cross member 9, a plurality of the beads 50, each having an arc form, are coaxially arranged at regular intervals with respect to the center point which is the intersection X1 between the center of the section at one end of the outrigger 13 and the inner side wall 26 of the side sill inner part 23. One ends of the beads 50 extend so as to be substantially perpendicular to the side sill inner part 23, and a part of the other ends of the beads 50 extend so as to be substantially perpendicular to the width direction of the above-described front side frame.

Each of the beads 50 has a trapezoidal sectional form formed by means of press working. The trapezoidal sectional form is different depending on the position along the length of each bead 50.

Figure 8:
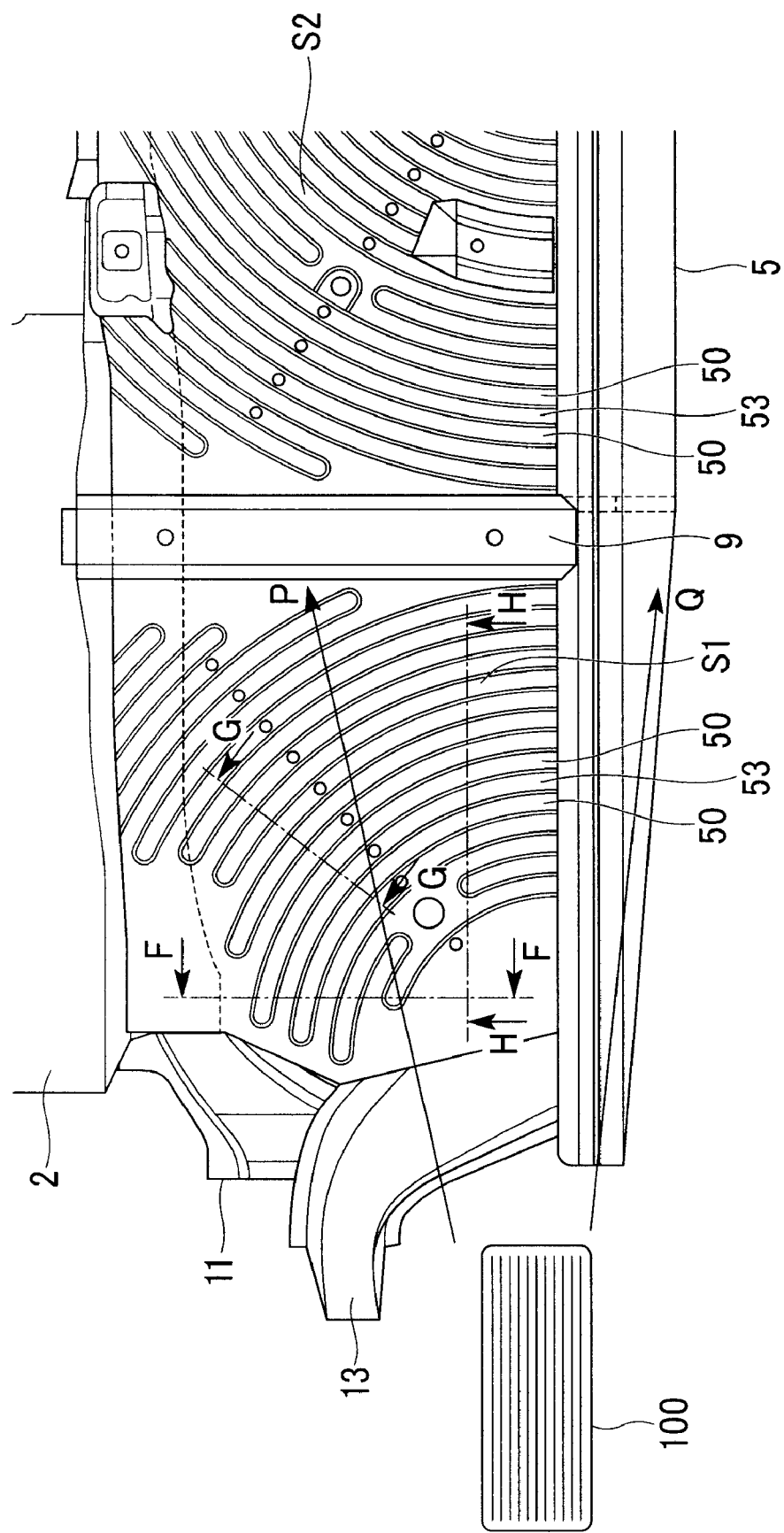
FIG. 8 is a plan view of a left part of the floor in the embodiment.
Figure 9A:
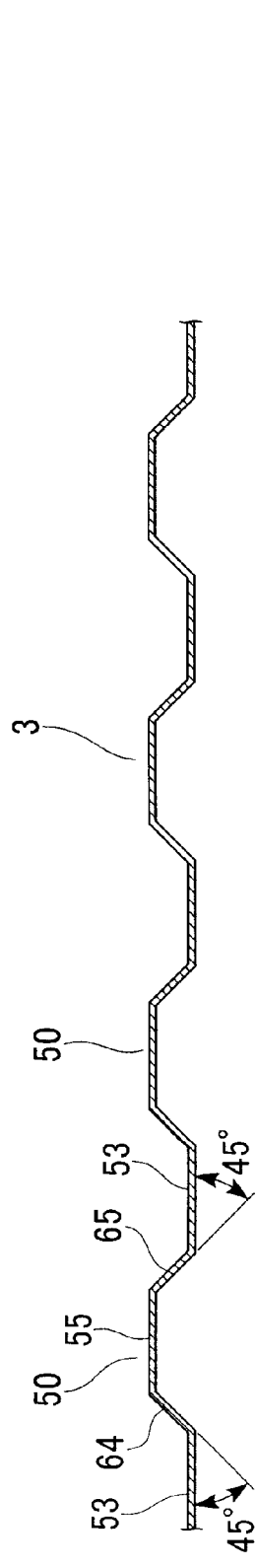
FIGS. 9A, 9B, and 9C are respectively sectional views along lines F-F, G-G, and H-H in FIG. 8.
Figure 9B:
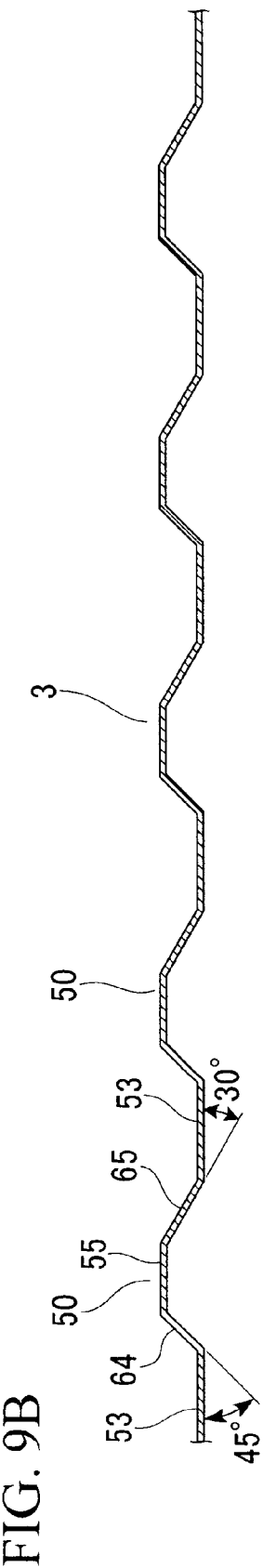
Figure 9C:
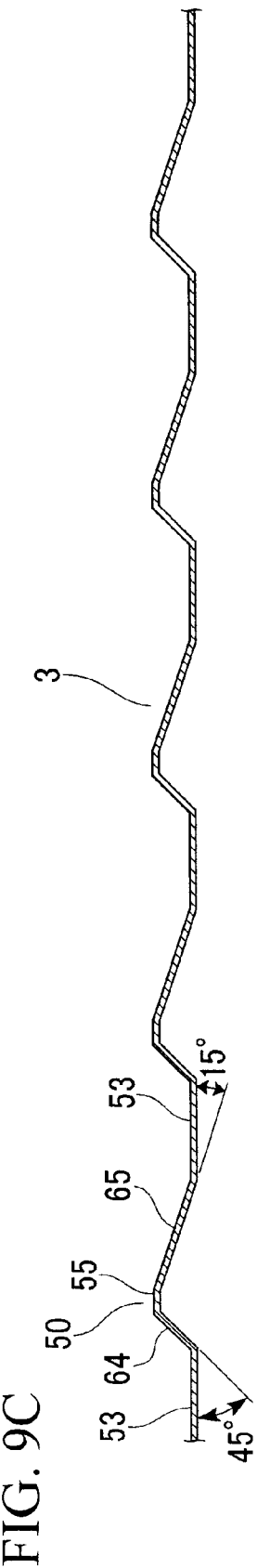
Figure 10A:
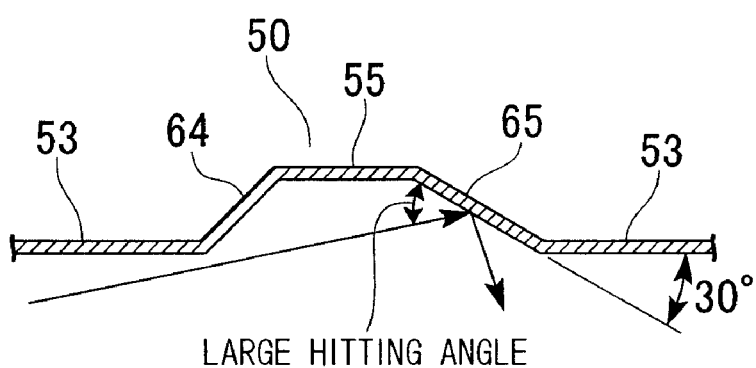
FIGS. 10A and 10B are diagrams used for explaining a difference in the hitting angle depending on the inclination angle of the rear wall of a bead when a small stone hits against the rear wall.
Figure 10B:
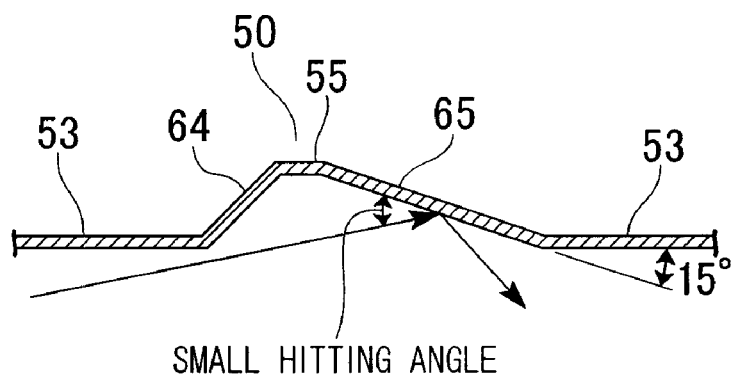

FIG. 8 is a plan view of a left part of the floor 1. FIGS. 9A, 9B, and 9C are respectively sectional views along lines F-F, G-G, and H-H in FIG. 8.

Each bead 50 consists of a flat head 55 and inclined front and rear walls 64 and 65 which join the head 55 from both sides thereof, and a valley 53 is formed between adjacent beads 50. In each bead 50, the front wall 64 has the same inclination angle (with respect to the horizontal position) at any position along the length of the bead 50. In contrast, the closer the side sill 5, the smaller the inclination angle (with respect to the horizontal position) of the rear wall 65 is. In other words, in each bead 50, the inclination angle (with respect to the horizontal position) of the rear wall 65 is gradually decreased in a direction from the inner side to the outer side along the width of the vehicle.

For example, with respect to the section (at the front of the front area S1) along the line F-F (see FIG. 8) in the width direction of the vehicle, as shown in FIG. 9A, the front wall 64 and the rear wall 65 of each bead 50 incline at the same inclination angle (e.g., 45 degrees) with respect to the horizontal position. However, with respect to the section along the line G-G rotated by approximately 45 degrees from the line F-F toward the side sill 5 around the center point X1 of the beads 50, as shown in FIG. 9B, in each bead 50, the front wall 64 inclines at the inclination angle of 45 degrees with respect to the horizontal position, while the rear wall 65 inclines at the inclination angle of 30 degrees with respect to the horizontal position. Furthermore, with respect to the section along the line H-H which is almost parallel to the side sill 5 and thus along the front-to-back direction of the vehicle body, as shown in FIG. 9C, in each bead 50, the front wall 64 inclines at the inclination angle of 45 degrees with respect to the horizontal position, while the rear wall 65 inclines at the inclination angle of 15 degrees with respect to the horizontal position. As shown in FIGS. 9A to 9C, as the inclination angle of the rear wall 65 decreases, the width of the relevant head 55 also decreases. In FIGS. 1, 2, and 8, the width of each head 55 has the same size for convenience of the drawings.

On the other hand, in another substantially rectangular area S2 (called the "rear area") on the back side of the front cross member 9, a plurality of the beads 50, each having an arc form, are also coaxially arranged at regular intervals with respect to the center point which is the intersection X2 between the center of the section at an end 47 of the middle cross member 7 and the inner side wall 26 of the side sill inner part 23. One ends of the beads 50 extend so as to be substantially perpendicular to the side sill inner part 23, and a part of the other ends of the beads 50 extend so as to be substantially perpendicular to the middle cross member 7.

Similar to the front area S1, in the rear area S2, the trapezoidal sectional form is different depending on the position along the length of the bead 50. That is, the front wall 64 has the same inclination angle (with respect to the horizontal position) at any position along the length of the bead 50, and in contrast, the closer the side sill 5, the smaller the inclination angle (with respect to the horizontal position) of the rear wall 65. In other words, in each bead 50, the inclination angle (with respect to the horizontal position) of the rear wall 65 is gradually decreased in a direction from the inner side to the outer side along the width of the vehicle.

Such a large number of the beads 50 improve the rigidity of the floor panels 3 and 4. The height of the beads 50 can be appropriately determined in consideration of a balance between the rigidity required for the floor panels 3 and 4 and the space in the interior of the vehicle.

Additionally, in the front area S1, the liquid discharge holes 51 and the positioning hole 52 are aligned on a line which is perpendicular to the beads 50 and is close to a diagonal for connecting the joint between the outrigger 13 and the side sill inner part 23 to the joint between the floor tunnel frame 2 and the front cross member 9. On the other hand, in the rear area S2, the liquid discharge holes 51 and the positioning hole 52 are aligned on a line which is perpendicular to the beads 50 and is close to a diagonal for connecting the joint between the floor tunnel frame 2 and the front cross member 9 to the joint between the middle cross member 7 and the side sill inner part 23.

Each of the liquid discharge holes 51 is provided at the center of each valley 53 formed between any adjacent beads 50, so as to discharge an electrodeposition liquid from the floor panel 3 when the floor panel 3 is extracted from the liquid in an electrodeposition process of the floor panel 3.

The front area S1 and the rear area S2 each have one positioning hole 52, which is formed in a joint part between two adjacent beads 50. Each positioning hole 52 is provided for inserting a positioning jig into the hole so as to position the relevant floor (3 or 4) when assembling the floor 1.

As described above, in each bead 50 of the floor panels 3 and 4, the closer the side sill 5, the smaller the inclination angle (with respect to the horizontal position) of the rear wall 65 is. Therefore, the lower surfaces of the floor panels 3 and 4 can be not easily damaged (e.g., the coating is not easily scraped off). Such an effect will be explained with reference to FIG. 8 and FIGS. 10A and 10B.

As shown in FIG. 8, during movement of the vehicle, a front wheel 100, which is positioned in front of the side sill 5 (i.e., almost on a line extended from the side sill 5), may dislodge small stones or the like on the road toward a rear part in the lower surface of the floor. In this case, the flying range of the small stones can be defined approximately between the arrows P and Q, that is, the range is offset to the outer side in the width direction of the vehicle.

With respect to small stones having the same flying speed and the same flying angle, the smaller the inclination angle of the rear wall 65 with respect to the horizontal position, the smaller the hitting (i.e., impact) angle of the relevant small stone against the real wall, that is, the rear wall receives a smaller impact. For example, when comparing a hitting of the small stone against the rear wall 65 having an inclination angle of 30° with respect to the horizontal position (see FIG. 10A) with a hitting of the small stone against the rear wall 65 having an inclination angle of 15° (see FIG. 10B), the rear wall 65 having the inclination angle of 15° has a smaller hitting angle of the small stone in comparison with the rear wall 65 having the inclination angle of 30°. Therefore, the rear wall 65 having the inclination angle of 15° receives a smaller impact.

As described above, when each bead 50 is arranged in a manner such that the closer the side sill 5, the smaller the inclination angle (with respect to the horizontal position) of the rear wall 65, then the inclination angle of the rear wall 65 is relatively small within the flying range of the small stones, thereby decreasing the impact by the small stones which hit the rear wall 65. Therefore, when flying objects such as small stones, dislodged by the front wheel 100, hit against the rear wall 65 of each relevant bead 50, the rear wall 65 is not easily damaged, for example, the coating applied to the rear wall 65 is not easily scraped off.

On the other hand, in a part which is relatively distant from the flying range of the small stones or the like, the rear wall 65 of each bead 50 has a relatively large inclination angle with respect to the horizontal position, so that the floor panels 3 and 4 can provide a relatively high rigidity.

Other Embodiments

While preferred embodiments of the invention have been described and illustrated above, it should be understood that these are exemplary embodiments of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

For example, in the above embodiment, each bead has a trapezoidal sectional shape, however, it may have a semicircular or triangular sectional shape.

Also in the above embodiment, when the beads 50 are formed in the floor panel 3, press working for forming upward protrusions (with respect to the general surface) is performed so as to form the beads 50 which protrude upward. However, press working for forming downward protrusions (with respect to the general surface) may be performed so as to form the beads 50 which protrude downward. In this case, in each bead 50, the inclination angle (with respect to the horizontal position) of the front wall is gradually decreased in a direction from the inner side to the outer side along the width of the vehicle.

What is claimed is:

1. A floor panel in a vehicle, wherein:
    a plurality of beads, each having an arc form, are coaxially arranged on the floor panel;
    the center of the coaxially-arranged beads is positioned on either of side sills provided on the right and left sides of the vehicle; and
    each of the beads has an inclined surface, and the inclination angle of the surface with respect to the horizontal position is gradually decreased along the arc of each bead in a direction from the inner side to the outer side along the width of the vehicle.

2. The floor panel in accordance with claim 1, wherein each of the beads protrudes upward, and has an inclined rear wall, and the inclination angle of the rear wall with respect to the horizontal position is gradually decreased along the arc of each bead in the direction from the inner side to the outer side along the width air the vehicle.

* * * * *

UNITED STATES PATENT AND TRADEMARK OFFICE
CERTIFICATE OF CORRECTION

PATENT NO. : 7,637,561 B2
APPLICATION NO. : 12/042036
DATED : December 29, 2009
INVENTOR(S) : Yasuhisa Egawa and Shigeto Yasuhara It is certified that error appears in the above-identified patent and that said Letters Patent is hereby corrected as shown below:

Column 8, Line 47, (Claim 2), delete "air" and insert -- of --.

Signed and Sealed this

Thirtieth Day of March, 2010

David J. Kappos
*Director of the United States Patent and Trademark Office*